United States Patent
Bunker et al.

(10) Patent No.: US 9,883,685 B2
(45) Date of Patent: Feb. 6, 2018

(54) FUSED DEPOSITION MODEL COLD SLURRY PRINTER

(71) Applicant: Massachusetts Institute of Technology, Cambridge, MA (US)

(72) Inventors: Kristine A. Bunker, Falmouth, MA (US); Jamison Go, Orlando, FL (US); Anastasios John Hart, Somerville, MA (US); Kyle N. Hounsell, Beechhurst, NY (US); Donghyun Kim, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 234 days.

(21) Appl. No.: 14/707,167

(22) Filed: May 8, 2015

(65) Prior Publication Data
US 2016/0324206 A1 Nov. 10, 2016

(51) Int. Cl.
*A23G 9/28* (2006.01)
*A23G 9/20* (2006.01)
(Continued)

(52) U.S. Cl.
CPC .............. *A23G 9/28* (2013.01); *A23G 9/20* (2013.01); *A23G 9/44* (2013.01); *A23P 20/20* (2016.08); *B33Y 70/00* (2014.12); *A23P 2020/253* (2016.08); *B29C 64/106* (2017.08); *B33Y 10/00* (2014.12); *B33Y 30/00* (2014.12)

(58) Field of Classification Search
CPC ... A23G 9/00; A23G 9/20; A23G 9/44; A23G 9/083; B29C 67/0055; B29C 67/0085; B29C 64/106; B33Y 30/00; B33Y 70/00; A23P 20/20; A23P 2020/253; A23P 1/086
See application file for complete search history.

(56) References Cited

U.S. PATENT DOCUMENTS

| | | | | | |
|---|---|---|---|---|---|
| 4,669,275 A | * | 6/1987 | Ohgushi | .................. | A23G 9/12 222/229 |
| 2003/0211192 A1 | * | 11/2003 | Bakker | .................... | A23G 9/04 425/208 |

(Continued)

FOREIGN PATENT DOCUMENTS

| | | | | | |
|---|---|---|---|---|---|
| CN | 103876263 A | * | 6/2014 | .......... | A23G 3/0242 |
| CN | 104757224 A | * | 7/2015 | | |

*Primary Examiner* — Joseph S Del Sole
*Assistant Examiner* — Mohamed K Ahmed Ali
(74) *Attorney, Agent, or Firm* — Sam Pasternack; MIT Technology Licensing Office (57) ABSTRACT

Fused deposition model printer system. The system prints cold slurry substances and includes a source of a cold slurry substance with a print platform supported for at least three axes of motion under computer control. An extruder head system including a nozzle extrudes a stream of the cold slurry substance from the source onto the print platform, the extruder head including a heater. A cryogen line is provided having a perforated section for surrounding the continuous stream of the cold slurry substance to spray a cryogen onto the cold slurry substance to cool it upon extrusion. A chilled compartment or freezer is provided in which the print platform, extruder head system, and cryogen line are contained to maintain those components at a selected temperature whereby the cold slurry substance is printed to form a desired three dimensional shape.

6 Claims, 6 Drawing Sheets

(51) Int. Cl.
*A23G 9/44* (2006.01)
*B33Y 70/00* (2015.01)
*A23P 20/20* (2016.01)
*B33Y 30/00* (2015.01)
*B33Y 10/00* (2015.01)
*A23P 20/25* (2016.01)
*B29C 64/106* (2017.01)

(56) References Cited

U.S. PATENT DOCUMENTS

2005/0132902 A1* 6/2005 D'Arcangelis ....... B29C 47/825
99/455
2015/0245635 A1* 9/2015 Smith .................... A23G 9/106
426/519

* cited by examiner

FUSED DEPOSITION MODEL COLD SLURRY PRINTER

BACKGROUND OF THE INVENTION

This invention relates to a fused deposition model cold slurry printer for printing cold slurrys such as soft serve ice cream into selected three-dimensional shapes.

Additive manufacturing has taken off over the last few decades and created a revolution in the manufacturing industry. More specifically, 3D printing has changed the way in which companies are able to prototype with almost any material, including plastic, metal, ceramic, and wood. Within the last decade, 3D printing has continued to push the boundaries of what was thought to be possible in industry prototyping and customization, hut just as importantly, it has entered mainstream culture. Fused deposition model (FDM) printing, which is the process of depositing layers of filament into a pattern while changing the z-plane has become a novelty and household name referred to generally as 3D printing. Stores are now available that sell desktop FDM printers or offering to make custom parts such as bracelets, scale buildings, busts, as a customer waits for the product to be printed.

In recent years, the innovations in FDM have skyrocketed and moved into materials ranging from concrete to chocolate. Most of the materials being used today rely on heating up of the material and printing into a warmed environment.

An object of the invention is a system for printing a cold material printed in a cold environment.

SUMMARY OF THE INVENTION

The fused deposition model printer system for printing cold slurry substances according to the invention includes a source of a cold slurry substance such as soft serve ice cream. A print platform is provided and is supported for at least three axes of motion under computer control. An extruder head system including a nozzle for extruding a stream of the cold slurry substance from the source onto the print platform is provided. The extruder head includes a heater. A cryogen line including a perforated section surrounding the stream of the cold slurry substance is provided to spray a cryogen such as liquid nitrogen on the cold slurry substance to cool it upon extrusion. A chilled compartment or freezer is provided in which the print platform, extruder head system and cryogen line are contained to maintain these components at a selected temperature wherein the cold slurry substance is printed to form a desired three dimensional shape.

In a preferred embodiment of the invention, the source of the cold slurry substance is a hopper that may also be a churn. It is preferred that the cryogen be contained within a Dewar in the chilled compartment. A compressor and storage tank communicates with the Dewar to force the cryogen through the cryogen line.

Extrusion pressure is supplied by the churn. The cold slurry substance is preferably a soft serve ice cream, but can be any cold slurry, such as sorbet or sherbet. A suitable cryogen is liquid nitrogen.

DESCRIPTION OF THE PREFERRED EMBODIMENT

Figure 1:
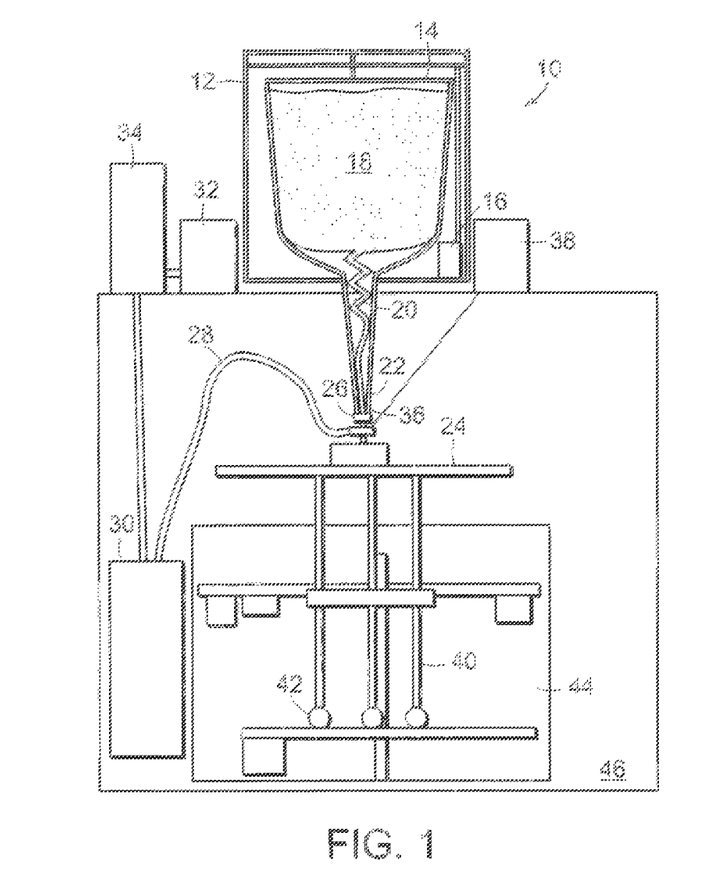
FIG. 1 is a schematic illustration of an embodiment of the fused deposition model cold slurry printer disclosed herein.

The primary design for the Fused Deposition Model Soft Serve Ice Cream Printer (FDM Ice Cream Printer) involves a bowl that churns soft serve ice cream, a cryogen system, used to freeze the ice cream upon extrusion, and a pre-made consumer 3D printer such as an altered Solidoodle 3D printer available from the Solidoodle company of Brooklyn, N.Y. The FDM Ice Cream Printer could also be used to print other "cold slurry" substances such as frozen yogurt, sherbet, or sorbet into three dimensional shapes. The printer takes 3D file inputs and outputs printed 3D shapes in soft serve ice cream or any other cold slurry substance, for example a star or heart (For the rest of this document the cold slurry printing substance will be referred to as "ice cream" but the same principles apply to any cold slurry being printed with the FDM Ice Cream Printer). A general schematic of the components and the assembly thereof in the FDM Ice Cream Printer can be seen in detail in FIG. 1. With reference now to FIG. 1, an embodiment 10 of the fused deposition model cold slurry printer includes a hopper 12 that supports a churner 14 supported for rotation by a motor 16. The churner 14 includes a cold slurry substance 18 such as soft serve ice cream. The churner 14 includes a screw section 20 for extruding the cold slurry 18 through a nozzle 22. The cold slurry 18 is deposited on a print platform 24. Upon extrusion of the cold slurry 18 through the nozzle 22, the cold slurry is encircled by a perforated section 26 of a cryogen line 28. The cryogen line 28 delivers liquid nitrogen to the perforated portion 26 from a liquid nitrogen Dewar 30. A compressor 32 pressurizes a pressure tank 34 to force the liquid nitrogen in the Dewar 30 through the cryogen line 28.

To ensure that the nozzle 22 does not freeze up in the presence of the liquid nitrogen emanating from the portion 26, a heating portion 36 under the control of an autotransformer 38 maintains a free flow of the cold slurry 18 through the nozzle 22.

The print platform 24 is supported by brass rods 40 in this embodiment so that the print platform 24 is able to move in three dimensions with respect to the nozzle 22. The brass rods 40 may be supported on ball casters 42.

Because the cold slurry 18 printed on the print platform 24 must retain its shape, the extruder nozzle 22, print platform, and the retraining portions of a 3D printer 44 along with the Dewar 30 are enclosed within a chilled compartment or freezer 46.

The ice cream hopper 12 contains a chilled hopper and rotating churner 14. The rotating churner 14 also acts as a screw 20 to push the ice cream 18 down to the extender nozzle 22 once the soft serve ice cream 18 is ready to print 3D shapes. The hopper 12 walls are made of metal and are filled with coolant. The coolant freezes, after being in a freezer (or at least 24 hours, and keeps the ice cream around 10° F. for two hours. An alternative method for the hopper could be made with electrically (e.g., pettier) or electromechanically (e.g., refrigerant loop) cooled elements similar to a freezer to avoid the long wait time for the coolant to freeze.

Figure 2:
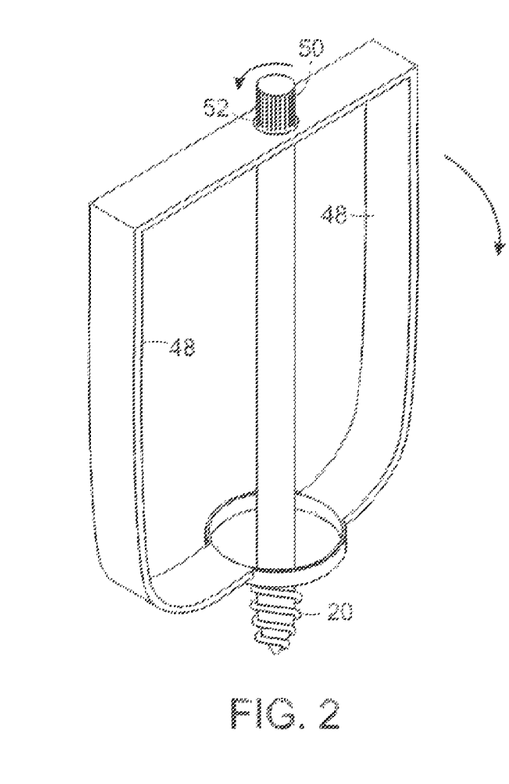
FIG. 2 is a perspective view of the ice cream churner that includes a screw portion to push the cold slurry substance.

The churner 14 is made of plastic and is dimensioned no that the outer diameter of a scraper 48 turning radius is 0.25" smaller than the inner diameter of the hopper to allow for clearance when spinning as shown in FIG. 2. They both have the same tapered curve at the bottom to aid in pushing the ice cream down the extruder and avoid ice cream getting stuck in the corners. This allows the churner to scrape off any accumulated ingredients off the sides of the hopper to fully and consistently mix the soft serve materials in the bowl and ensure that none of the ingredients get frozen to the sides of the bowl. On the bottom of the hopper there is a hole that fits the screw component 20 of the churner. This section of the churner is essentially one middle rod through the edge scrapers, slipped like a screw at the bottom to push the ice cream down into the extruder. The churner is attached to the motor 16 which spins the scrapers 48 at a constant speed throughout the process. The motor 16 is attached to the churner 14 at the very top nob 50 through a lid that locks the churner into a vertical position. When the motor is turned on, the two pieces of the churner spin in opposite directions through a gear train 52. Alternatively, the churner 14 could be held stationary with the hopper motorized to get the same screw effect. The hopper could also be pressurized to force the ice cream down instead of using a motor and churner. The motor 16, hopper 12, and churner 14 are encased in plastic but this encasement could be made of metal or wood.

Figure 3:
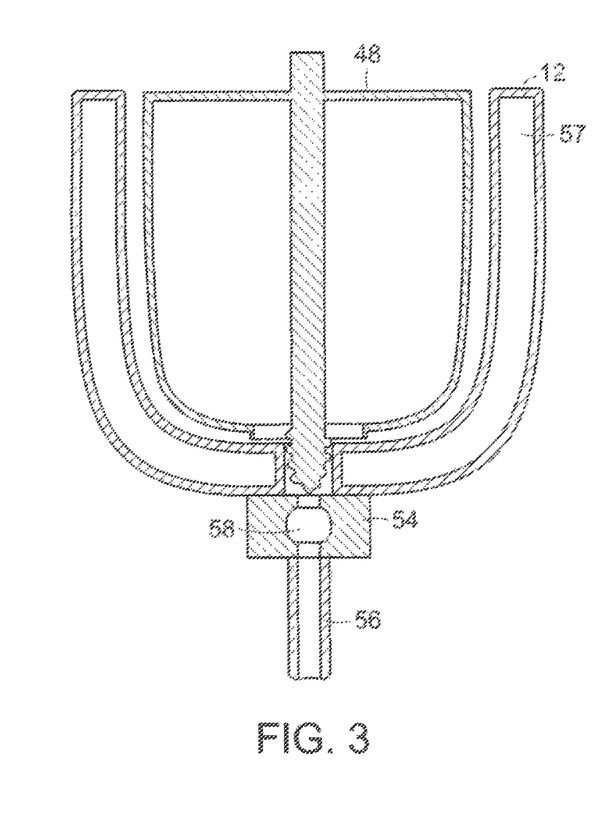
FIG. 3 is a cross-sectional view of an embodiment of the hopper and churn system disclosed herein.
Figure 4:
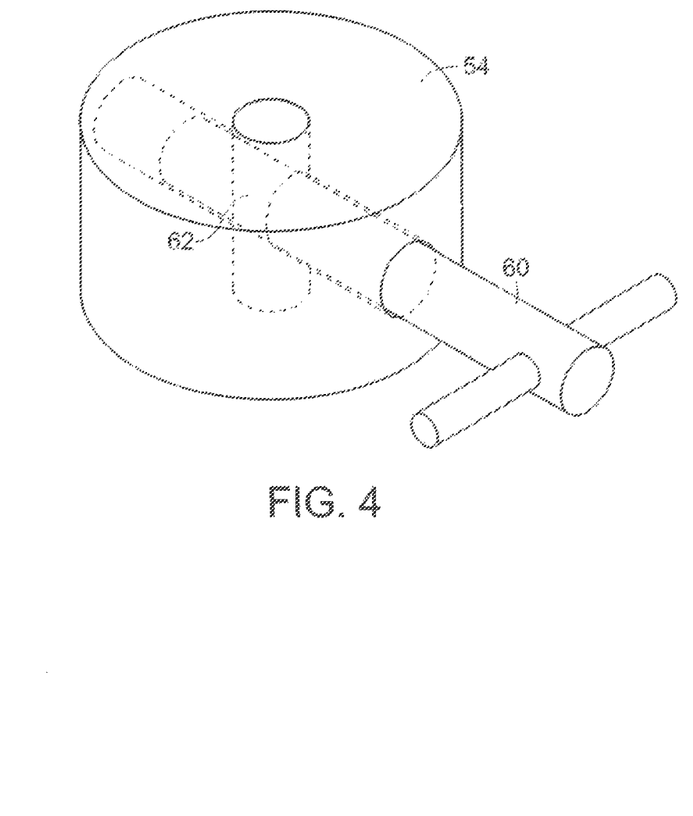
FIG. 4 is a perspective view of a valve used to start and stop the ice cream flow during the printing process.

Attached to a hole in the hopper 12 is a Delrin valve piece 54 leading to a ¼" plastic (such us PVC) robe 56 for extrusion of the ice cream as shown in FIG. 3. The hopper 12 includes a space 57 filled with a coolant. The piece of Delrin 54 has a hole drilled through for the ice cream to pass from the hopper to the extruder tube. There is another hole 58 drilled through, of larger diameter than the ice cream flow hole, for a cylindrical stopper 60 to press in and act as a valve to stop ice cream flow as shown in FIG. 4. The valve plug or stopper 60 is made from a piece of aluminum but could be made of any type of metal or plastic with cold temperature resistance. The aluminum valve plug 60 is pulled straight out of the Delrin piece 54 to allow ice cream to flow along the path 62 once everything is ready for printing. Another option for the operation of the valve 54 could be through turning, similar to turning on or off a faucet rattier than a linear motion. Alternatively the valve 54 could be placed down at the extruder head rather than directly below the hopper. This whole configuration is attached with adhesive to the top of the freezer 46 with a hole for the extruder tube to fit through, however this, configuration could have been placed inside the freezer 46 as well. The valve 54 may be computer controlled in order to stop or start the How of ice cream mid-print.

Figure 5:
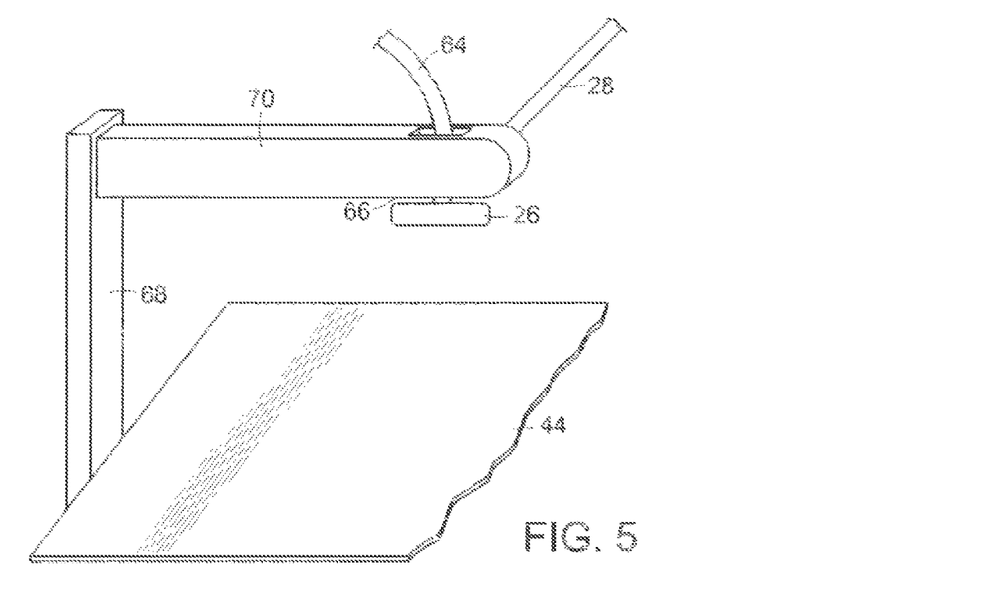
FIG. 5 is a perspective view of an extruder fixture attached to a pre-made consumer 3D printer such as a Solidoodle printer for holding the extruder stationary during the printing process.
Figure 6:
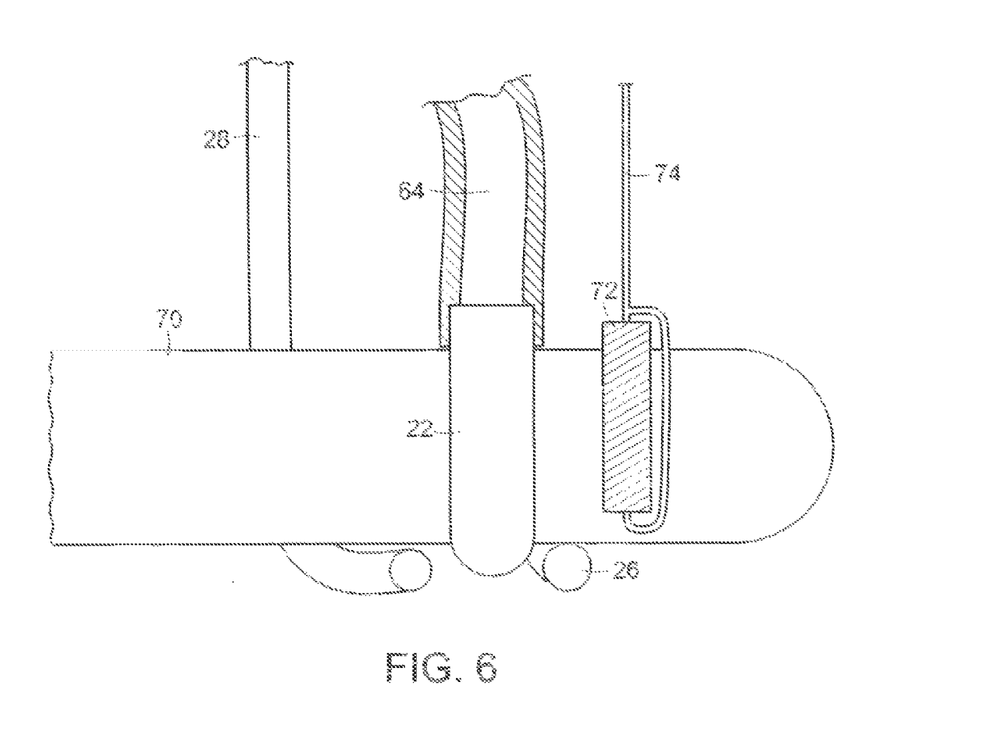
FIG. 6 is a cross-sectional view of an embodiment of the extruder system disclosed herein.

With reference to FIG. 5 the tube 64 connecting the hopper system to the extruder head 66 is made of a ¼" plastic tube. The tube 64 could also be constructed of other plastics of varying diameters depending on speed of pruning and tin of the extruder head 66. The tube 64 is fed into the extruder and connected to the extruder head 66. The extruder is an aluminum fixture with a brass extruder nozzle of ⅛" diameter. Toe brass extruder nozzle may be coated with a food-safe plastic coating if necessary. The extruder is made of two pieces of aluminum connected at a right angle with screws. One piece 68 is connected to the back of the 3D printer frame 44 while the other piece 70 extends over the top off the printer 44. Contrary to typical 3D printer designs, the extruder for the FDM Ice Cream Printer is stationary. The piece 70 that extends over the top has a hole drilled all the way through to hold the extruder head 66 and tube 64. A second hole is drilled directly next to the first to hold a heating element used to keep the extruder head temperature at 18° F. The extruder head 66 is a hollowed out cylindrical piece of brass starting from the diameter of the incoming tube and then tapering so the desired ⅛" diameter for extrusion of the ice cream. The bottom of the extruder head is located 8 mm above the printing platform when it is at its z-zero position. As shown in FIG. 6, this fixturing system can be made of different types of metals or plastics to achieve the same stationary hold of the extruder head. Alternatively the whole fixture can be connected directly to the freezer 46 wall lather than the 3D printer 44. Other materials that held their shape under extreme temperatures can be used to construct the extruder head. The extruder head can end in a different final diameter depending on the desired size and speed of printing the ice cream.

There is a heating system to moderate the temperature of the extruder head while being sprayed try liquid nitrogen. The heating system, shown in FIG. 6, is comprised of a variable autotransformer 38 (FIG. 1) supplying 35V of AC voltage to a 58 Ω resistor 72. The variable autotransformer 38 automatically regulates the voltage going us the resistor 72 to keep the extruder temperature between 18° F. and 20° F. A thermocouple is inserted into the aluminum fixture piece 70 next to the extruder nozzle 22. This is then connected with wires 74 to the variable autotransformer 38 which travels through the freezer, out the top to the variable autotransformer which is adhered to the top of the freezer. The resistor size and variable autotransformer supply can be altered depending on the temperature of the freezer, rate of liquid nitrogen flow, and material properties of the extruder. The variable autotransformer could also have been connected to the side of the freezer.

Figure 7:
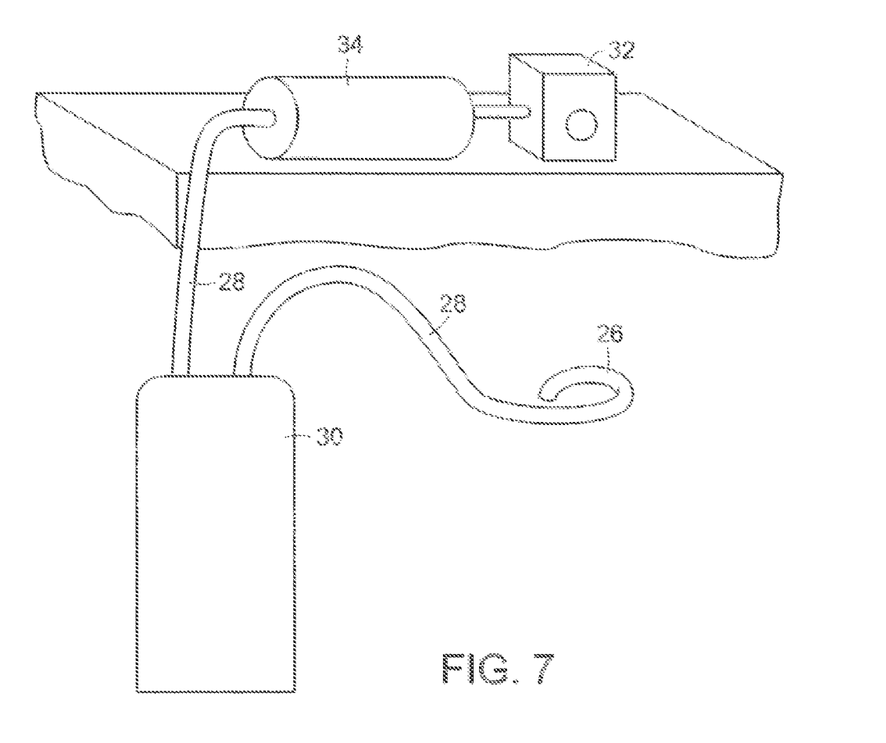
FIG. 7 is a schematic illustration of an embodiment of the cryogen system disclosed herein.
Figure 8:
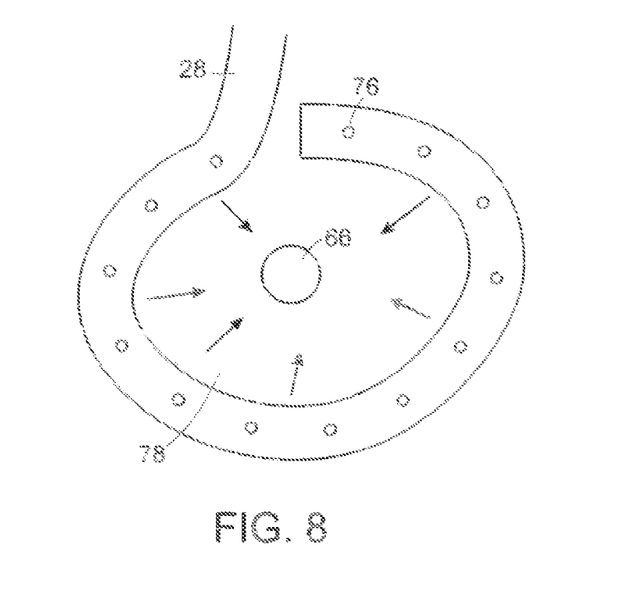
FIG. 8 is a bottom view of the cryogen spraying system that wraps around the extruder nozzle and sprays the extruded ice cream in all directions through small holes in the tubing.

As shown in FIG. 7, the cryogen system is comprised of a Dewar 30, a compressor 52 and pressure tank 34, and cryogen line 28. The Dewar 30 is 1 L in volume and built with a double-walled flask made of aluminum with a vacuum between the walls. This is used to hold the liquid nitrogen in its liquid state before spraying onto the extruded ice cream. The top of the Dewar 30 is a 1" thick piece of Delrin with two ¼" holes. One hole holds the cryogen line and other holds a ¼" plastic tube which connects up to the pressure tank. The cryogen line is made of ¼" topper tubing and is formed into a circle to surround the extruder head as shown in FIG. 8. The end of the copper tube is crimped to avoid any liquid nitrogen from exiting the tube at the end, instead small holes 76 are drilled at 45° into the copper rube to allow the liquid nitrogen to be sprayed in ail directions on the ice cream as it is extruded as indicated by the arrows 78. The cryogen line could have been made from a larger size copper lubing to increase liquid nitrogen flow. Additionally the cryogen line did not have to surround the extruder head 66, the liquid nitrogen could have been sprayed out of the lube directly onto the extruded ice cream.

The compressor 32 is charged to 5 Psi to regulate the flow rate of liquid nitrogen during the printing process. The compressor 32 fills the pressure tank 34 which is connected to the Dewar 30 with a ¼" plastic tube. The 5 Psi pressure forces the liquid nitrogen nut of the Dewar to spray continually during the printing process. The Dewar 30 is located inside the freezer, but it could have also been located outside with the copper tubing going through the side of the freezer. The compressor 32 and pressure tank 34 are located on the top of the freezer 46 with the variable autotransformer 38 and ice cream hopper 14 but could also be fixed inside of the freezer.

The printing platform is inside the freezer so ensure the printed ice cream 3D shape stays frozen at a constant temperature of 10° F. The size of the freezer is 2'×2'×4'. The 3D printer fits into the bottom of the freezer. By elevating the print platform the dimensions of the build volume of the FDM Ice Cream Printer matches that of the 3D printer. The 3D printer print platform was removed and replaced with a piece of plastic spanning the full inner dimensions of the printer and called the traverse platform.

Figure 9:
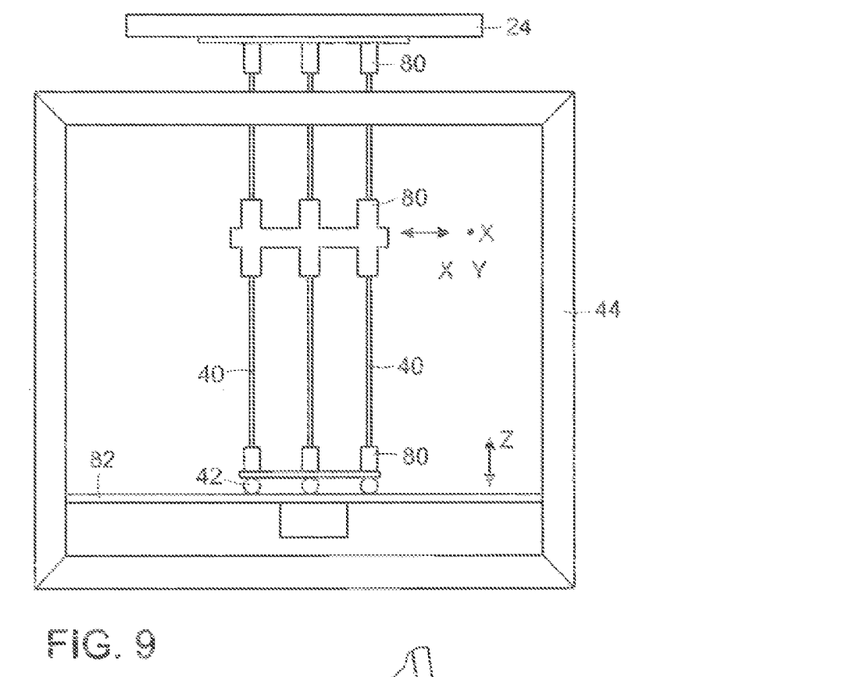
FIG. 9 is a cross-sectional view of another embodiment of the printing system disclosed herein.

With reference to FIG. 9, the print platform is built with a baseline elevation, z-zero, located 7" above the top of the Solidoodle printer. The print platform 24 is supported by three continuous brass rods 40 which are held in place at the bottom and top by press fit plastic sleeves 80. The brass rods 40 are guided by plastic guiding sleeves 80 which are connected so the Solidoodle at the position where the old extruder was located. The rods 40 extend ail the way to a traverse platform 82 where they are connected to three ball casters 42 which allow the printing platform assembly to move freely in ail three x, y, and z directions.

Figure 10:
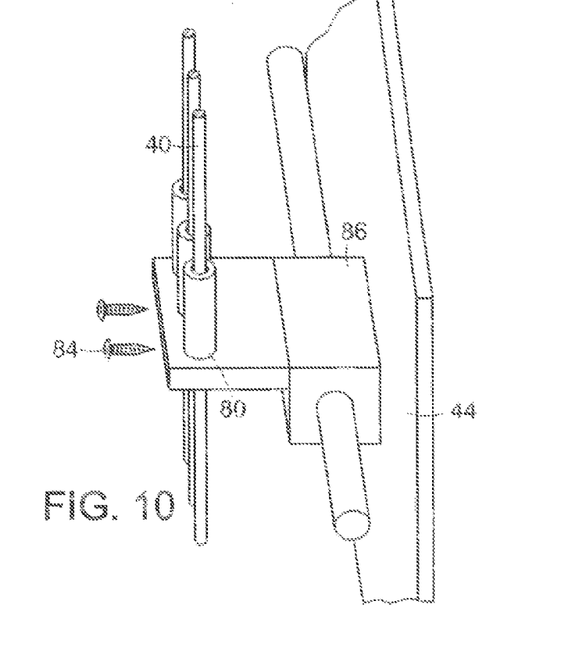
FIG. 10 is a schematic view showing the attachment of plastic pieces to position the Solidoodle extruder head.
Figure 11:
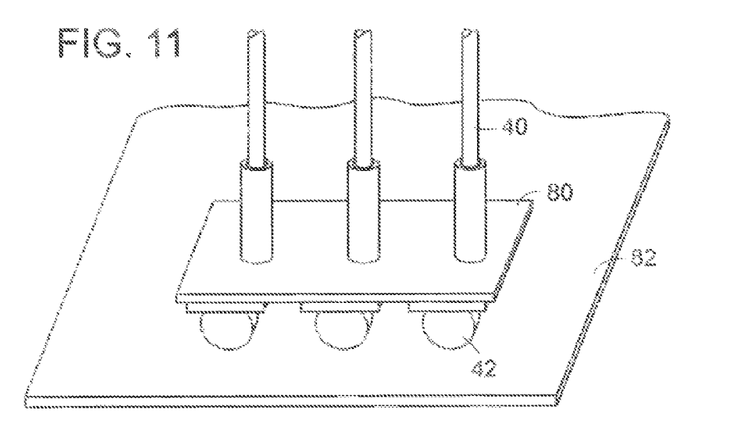
FIG. 11 is a perspective view showing details of the translating motion for system operation.

The three brass rods 40 are attached to the print platform 24 with another plastic fitting that also has three cylindrical support sleeves to press fit the rod into. This fitting is glued to the bottom of the 6"×6" plastic prim platform. For the FDM Ice Cream Printer the original extruder was taken off the Solidoodle and replaced with the plastic guiding sleeves. As shown in FIG. 10, this plastic fitting is connected to the Solidoodle printer with screws 84 located at the original Solidoodle extruder attachment location. The plastic guiding sleeve 80 is made of one piece of plastic with three holes with cylindrical supports sleeves allowing the three ⅛" diameter and 12" long brass rods to pass through freely. At the bottom the rods are press fit into to a third plastic fitting 86 with the same cylindrical support sleeves. This bottom fitting connects to three ball caster wheels ¾" in diameter as shown in FIG. 11. The casters 42 rest on the traverse platform 82 substituting the original Solidoodle print platform. Alternatively, the original Solidoodle system with x and y movement of the extruder head and z movement of the print platform could have been used instead of having a stationary print head and fully mobile print platform as in the design of the FDM Ice Cream Printer. All the fittings along with the print platform and traverse platform could have been made out of metal instead of plastic. Instead of hail caster wheels, the rods could be connected to regular caster wheels or Omni wheels.

To start the 3D printing process, the ice cream hopper bowl is placed in a freezer upside down and left for at least 24 hours. Once the bowl is fully frozen, it is placed back into the FDM Ice Cream Printer and the ingredients for making the ice cream (cream, milk, flavor, and sugar mixture) are placed into the bowl and the churning process begins. After about 20 minutes of churning, the ice cream achieves the desired consistency for printing into 3D shapes. While the ice cream is churning, the exemplary Solidoodle printer is hooked up to a computer and a Standard Tessellation Language (stl) file is loaded into the Solidoodle software Repetier Host to generate the print pattern. The Solidoodle can also be reprogrammed to use other open source software and take different file formats such as Drawing Interchange Format (dxf) or Polygon File Format (ply). Within the Repetire set-up parameters the first layer height is set at 8 mm, subsequent layer height at 3 mm, retract distance at 0 mm, and the print speed is set at 16 mm/sec. The final parameters and printing pattern is uploaded into the Solidoodle printer controls. The FDM Ice Cream Printer will then go through a series of checking motions to make sure nothing is blocking its fell motion and puts the extruder head at x, y, and z zero.

Figure 12:
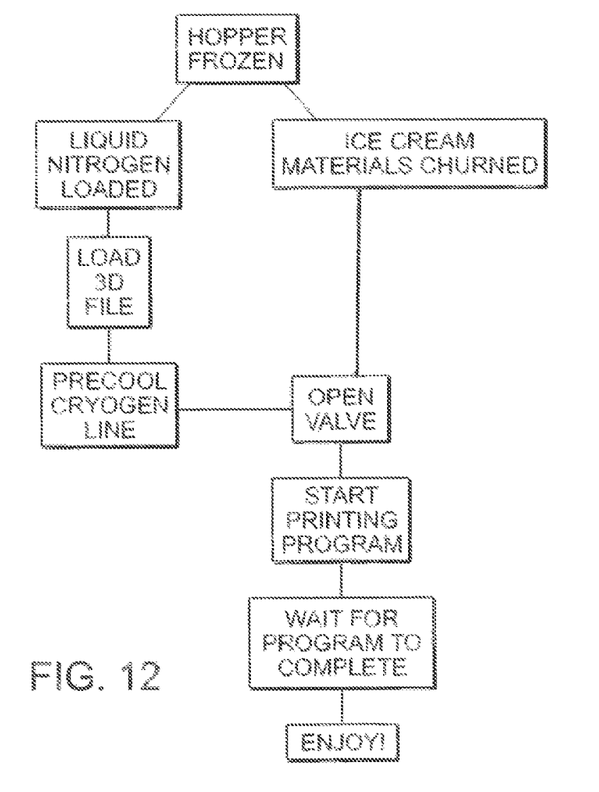
FIG. 12 is a flow chart illustrating the steps in the process for printing a cold slurry material.

Next, the Dewar 30 is completely filled with liquid nitrogen is installed into the FDM Ice Cream Printer. The compressor 32 is mined on and liquid nitrogen begins flowing to precool the cryogen line 28. Once the ice cream has reached the proper consistency, the valve is opened for the ice cream to start flowing. As soon as the ice cream begins having consistent flow from the extruder head onto the printer bed, the printer program can be started. The extruder, located 8 mm from the print platform at the beginning of the process, starts to emit ice cream in 3 mm layer height increments. The print platform moves at a speed of 16 mm/sec without any retraction movements. The FDM Ice Cream Printer runs through the preset printing program until the complete 3D ice cream treat is printed (See FIG. 12 for process flow chart). The speed and layer size of the printing process can be varied depending on the extrusion speed, extrusion diameter, and liquid nitrogen spray speed. The build volume of the FDM Ice Cream Printer is 6"×6"×6" and can support any 3D shape with minimal slope overhangs and voids resulting therefrom.

It is recognized that modifications and variations of the present invention will be apparent to those of ordinary skill in the an and it is intended that all such modifications and variations be included within the scope of the appended claims.

What is claimed is:

1. Fused deposition model printer system for printing cold slurry substances comprising:
   a source of a cold slurry substance;
   a print platform supported for at least three axes of motion under computer control;
   an extruder head system including a nozzle for extruding a stream of the cold slurry substance from the source onto the print platform, the extruder head including a heater;
   a liquid nitrogen line, including a perforated section encircling the stream of the cold slurry substance to spray liquid nitrogen in all directions onto the cold slurry substance to cool it upon extrusion; and
   a chilled compartment in which the print platform, extruder head system, and liquid nitrogen line are contained to maintain these components at a selected temperature, whereby the cold slurry substance is printed to form a desired three-dimensional shape.

2. The system of claim 1 wherein the source of the cold slurry substance is a hopper.

3. The system of claim 2, wherein the hopper is also a churn.

4. The system of claim 1 wherein the liquid nitrogen is contained within a Dewar in a freezer compartment.

5. The system of claim 4, further including a compressor and storage tank communicating with the Dewar.

6. The system of claim 1 wherein the cold slurry substance is soft serve ice cream.

\* \* \* \* \*